United States Patent
Rodecker

(10) Patent No.: US 8,152,146 B2
(45) Date of Patent: *Apr. 10, 2012

(54) EXTERNAL SHEAR-HUB ISOLATOR

(75) Inventor: Troy P. Rodecker, Berlin Heights, OH (US)

(73) Assignee: The Pullman Company, Milan, OH (US)

( * ) Notice: Subject to any disclaimer, the term of this patent is extended or adjusted under 35 U.S.C. 154(b) by 1031 days.

This patent is subject to a terminal disclaimer.

(21) Appl. No.: 12/045,139

(22) Filed: Mar. 10, 2008

(65) Prior Publication Data

US 2009/0224448 A1    Sep. 10, 2009

(51) Int. Cl.
    *F16F 7/00* (2006.01)
(52) U.S. Cl. ........... 267/141.4; 267/141.1; 267/141.5; 267/294; 267/153; 180/68.4; 180/89.2; 180/296; 180/309; 248/60; 248/610
(58) Field of Classification Search ........... 267/141.1, 267/141.2, 141.4, 141.5, 140.12, 293, 294, 267/153; 248/58, 60, 609, 610, 635; 180/89.2, 180/296, 309, 68.4
See application file for complete search history.

(56) References Cited

U.S. PATENT DOCUMENTS

| | | | | |
|---|---|---|---|---|
| 2,132,840 A | * | 10/1938 | Workman et al. | 267/141.4 |
| 2,538,658 A | * | 1/1951 | Saurer | 267/141.5 |
| 3,957,127 A | * | 5/1976 | Bouchard et al. | 248/599 |
| 4,651,839 A | * | 3/1987 | Isobe | 180/68.4 |
| 4,997,169 A | * | 3/1991 | Nakamura et al. | 267/140.13 |
| 5,121,905 A | * | 6/1992 | Mann et al. | 267/141.4 |
| 5,284,315 A | | 2/1994 | Hofmann et al. | |
| 5,655,758 A | * | 8/1997 | Hadano et al. | 267/141.7 |
| 6,435,489 B1 | * | 8/2002 | Rice et al. | 267/140.5 |
| 6,758,300 B2 | | 7/2004 | Kromis et al. | |
| 7,316,389 B2 | * | 1/2008 | Rawson | 267/141.7 |
| 7,644,911 B2 | * | 1/2010 | Rodecker | 267/293 |
| 7,735,812 B2 | * | 6/2010 | Fitzgerald | 267/293 |
| 2007/0063401 A1 | | 3/2007 | Rodecker | |
| 2009/0224450 A1 | * | 9/2009 | Rodecker | 267/294 |

FOREIGN PATENT DOCUMENTS

| | | |
|---|---|---|
| JP | 2005-120847 | 5/2005 |
| WO | WO2007037924 | 4/2007 |

OTHER PUBLICATIONS

Search Report and Written Opinion dated Sep. 28, 2009 in corresponding PCT Application No. PCT/US2009/036643.

* cited by examiner

*Primary Examiner* — Robert Siconolfi
*Assistant Examiner* — Mariano Sy
(74) *Attorney, Agent, or Firm* — Harness, Dickey & Pierce, PLC

(57) ABSTRACT

An elastomeric isolator has an elastomeric body which incorporates an inner structural member and an outer structural member. The elastomeric body includes a shear hub extending between radial flanges defined by the inner and outer structural members that undergoes shearing stresses during deflection of the elastomeric isolator. The inner and outer structural members are designed to provide a travel stop for the elastomeric isolator in order to avoid compression of the shear hub during high loads. The elastomeric bushing can also includes an optional integral elastomeric heat shield which protects the shear hub.

19 Claims, 3 Drawing Sheets

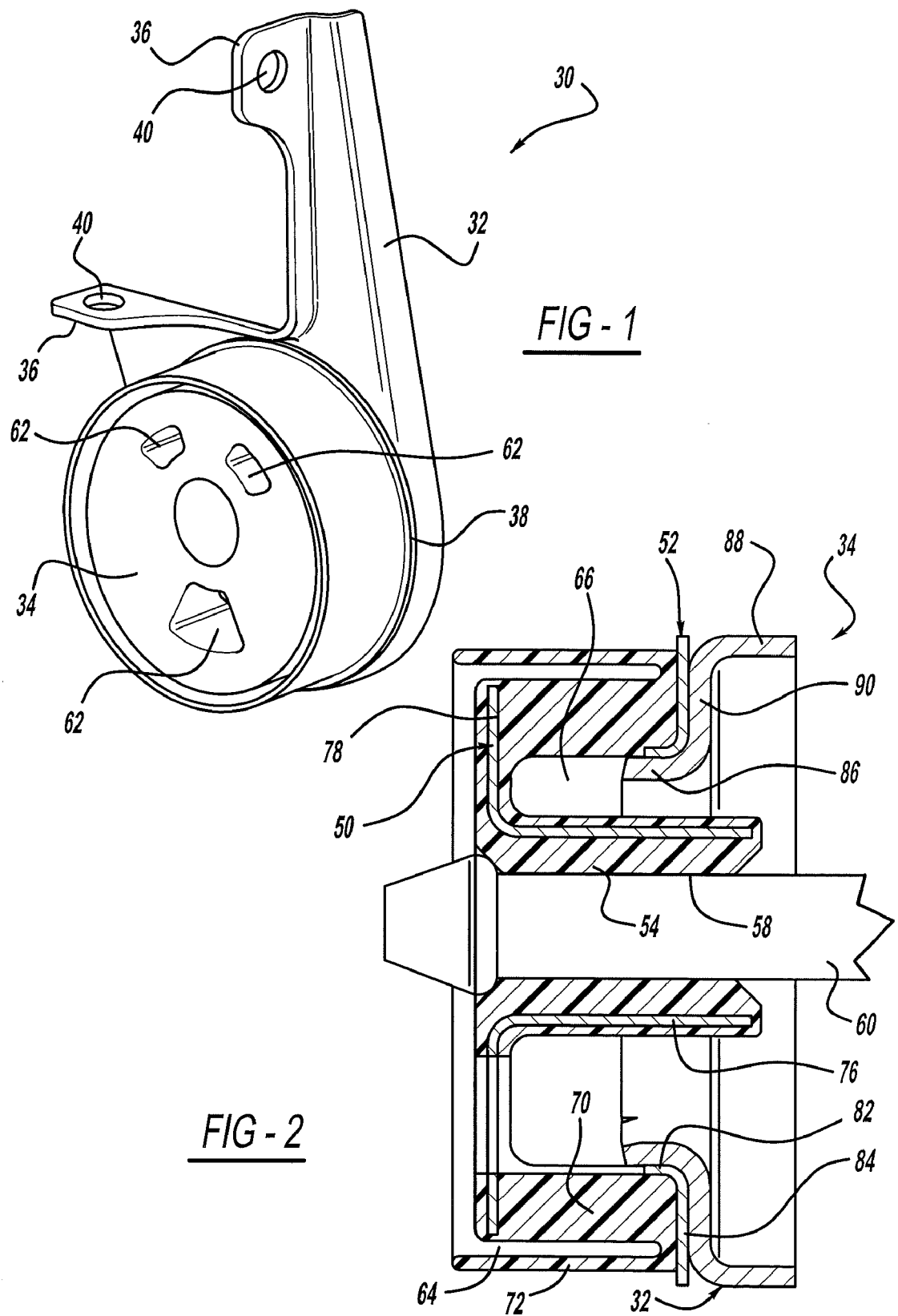

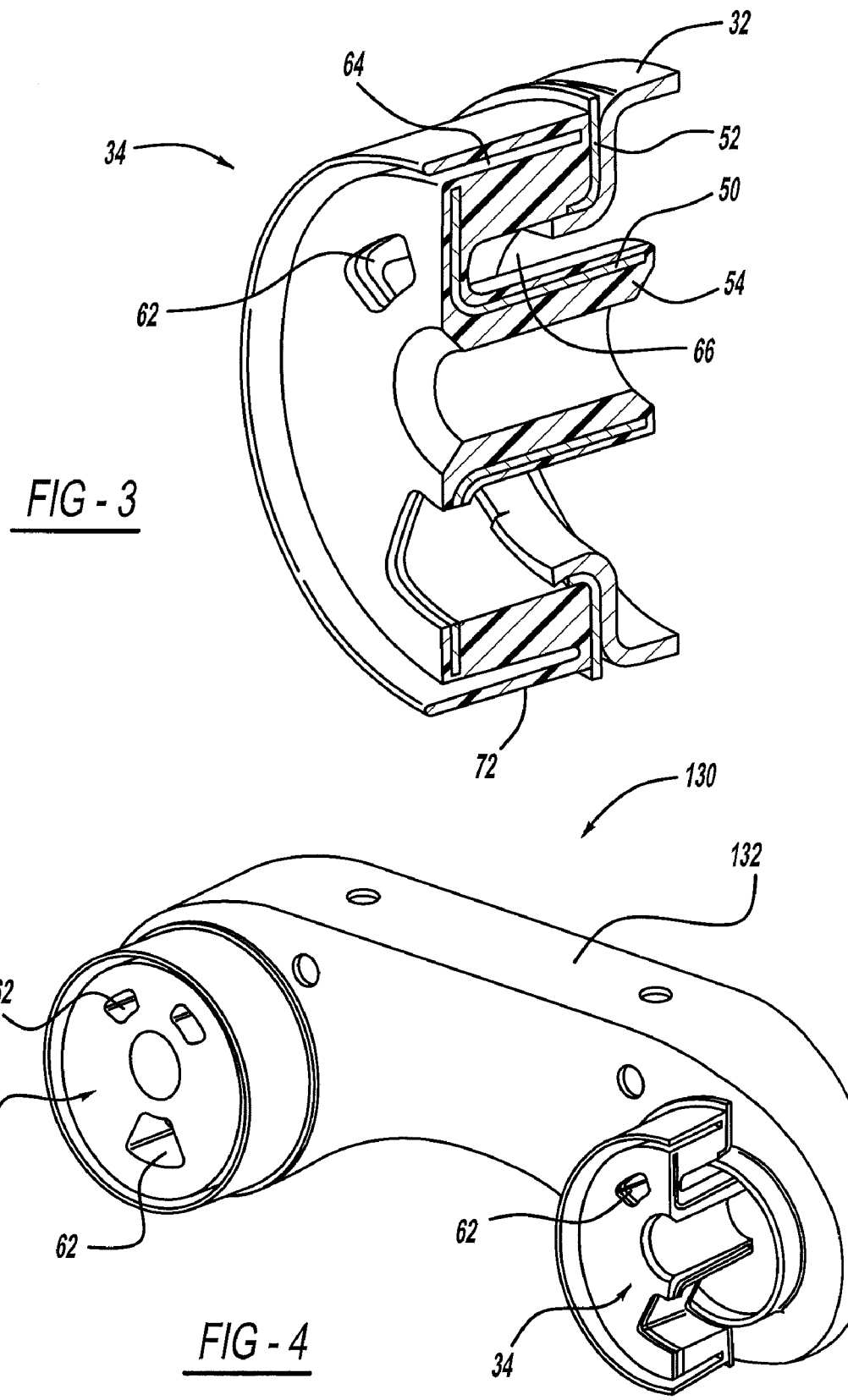

EXTERNAL SHEAR-HUB ISOLATOR

FIELD

The present disclosure relates to an isolator such as an automotive exhaust system isolator. More particularly, the present disclosure relates to an isolator which is configured to provide a very soft on-center rate, to have the ability to endure spike durability loads and to avoid compression of the shear-hub element during compression.

BACKGROUND

The statements in this section merely provide background information related to the present disclosure and may not constitute prior art.

Typically, automotive vehicles including cars and trucks have an internal combustion engine which is coupled to at least a transmission and a differential for providing power to the drive wheels of the vehicle. An engine exhaust system which typically includes an exhaust pipe, a catalytic converter and a muffler is attached to the engine to quiet the combustion process, to clean the exhaust gases and to route the products of combustion away from the engine to a desired position typically at the rear of the vehicle. The exhaust system is supported by exhaust mounts which are positioned between the exhaust system and the frame or some other supporting structure of the vehicle body. In order to prevent engine vibrations from being transmitted to the car body, the exhaust mounts incorporate flexible members or elastic suspension members to isolate the vehicle's exhaust system from the vehicle's body. In order to effectively isolate the vehicle's exhaust system from the vehicle's body, it is preferred that the isolator include a soft on-center rate of deflection.

The prior art exhaust mounts or isolators have included rubber isolators which are a solid rubber component or a puck that is at least three-quarters of an inch thick and which is provided with at least one pair of apertures extending therethrough. The apertures each receive an elongated metal stud. The metal stud is provided with an enlarged tapered head that can be forced through the aperture in the isolator, but it cannot be readily removed from the isolator. The opposite end of the stud is welded to or otherwise secured to either a support point in the vehicle or to one of the components of the exhaust system.

Other designs for isolators include elastomeric moldings of a spoke design where spokes are loaded in tension and compression and a shear leg design that include a leg that is subjected to shearing in the primary loading direction. Most elastomers which are utilized for exhaust isolators exhibit poor tensile fatigue properties stemming from low tear strength properties. The preferred method to load the elastomeric material is in compression or shear.

The prior art puck design is the simplest design, and as discussed above, two pins are inserted at opposite ends of the elastomer and the loads inflict pure tension on the elastomer cords connecting both ends. While this is typically the lowest cost design, it is also the most abusive to the material. In order to offset the failure risk, flexible and/or rigid bands are typically designed inside or around the outside of the elastomeric puck. The advantage of this design is its ability to swivel about one hanger hole to accommodate large positional tolerances for the hanger.

The prior art spoke design isolators load the elastomeric material in compression and tension. The tensile loading makes the design vulnerable to fractures in overloaded conditions. The stress magnitude is directly proportional to the load divided by the minimum spoke cross-sectional area. An additional requirement of the spoke design is that the mating component or hanger pin be centered within the deflection zone while statically preloaded by the weight of the exhaust. If it is not, the voids designed into the isolator will be bottomed out or positioned in a groundout condition. This results in the soft on-center rate not being employed, thus defeating the purpose of the isolator.

The prior art shear leg design has a primary loading direction which is typically vertical and a secondary loading direction which is typically lateral. When the shear leg design is loaded in its primary loading direction, the loading method is the preferred shear style loading. In addition, this shear style loading is able to be designed desirably soft. However, the secondary loading direction inflicts tensile compressive stresses which are unfavorable for durability. In addition, the secondary loading direction has a rate that is two to three times stiffer than the primary rate which is also an unfavorable condition.

The continued development of elastomeric mounts has been directed to elastomeric mounts which include a soft on-center rate while avoiding the undesirable tension loading of the elastomeric bushing and which avoid compression of the shear-hub during high ground-out loads. While this has been achieved in the prior art shear-hub designs, stress concentrations at the ends of the voids continues to be a problem.

SUMMARY

The present disclosure provides the art with an elastomeric bushing which uses radial loading to avoid the tension stress loading of the bushing. The radial loading causes shear stresses of the elastomeric bushing regardless of the direction of the loading. Tuning for rate and deflection in specific directions can be independent from other directions by altering voids in the elastomeric bushings. The elastomeric bushing includes a shear-hub which does not compress during high ground-out loads experienced by the isolator. This design also allows the elastomeric bushing to be more compact for reduced package design.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present disclosure will become more fully understood from the detailed description and the accompanying drawings, wherein:

FIG. 1 is a perspective view of an elastomeric isolator assembled to a bracket in accordance with the present disclosure;

FIG. 2 is a cross-sectional view of the elastomeric isolator illustrated in FIG. 1;

FIG. 3 is a perspective view partially in cross-section illustrating the metal or plastic inserts of the elastomeric isolator illustrated in FIG. 1;

FIG. 4 is a perspective view partially in cross-section of an elastomeric isolator in accordance with another embodiment of the present invention.

DESCRIPTION

Figure 5:
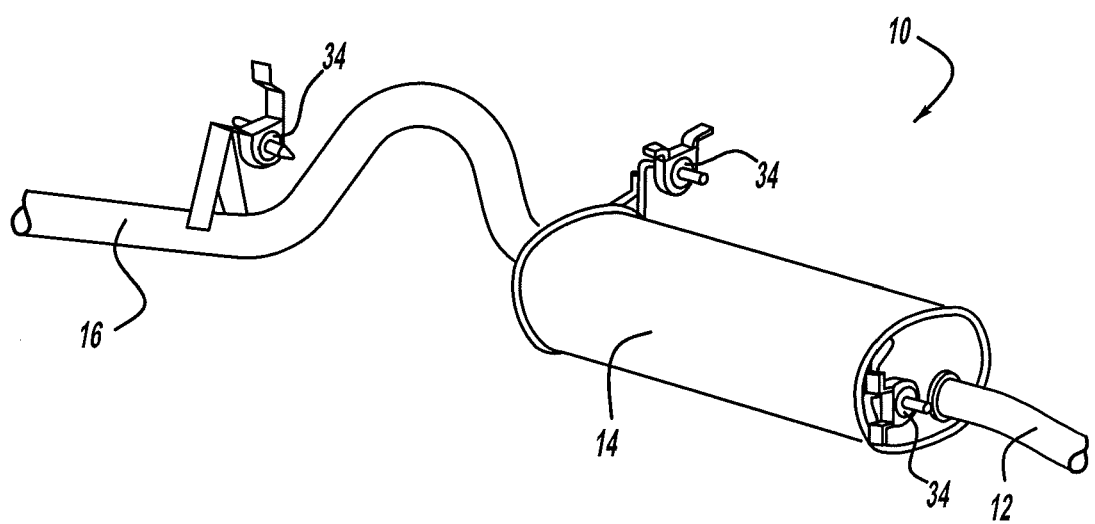
FIG. 5 is a perspective view of an exhaust system which incorporates the unique exhaust isolators in accordance with the present invention.

The following description of the preferred embodiment(s) is merely exemplary in nature and is in no way intended to limit the invention, its application, or uses.

Referring now to the drawings, there is shown in FIG. 5 an exhaust system which includes the exhaust system isolators in accordance with the present disclosure and which is designated generally by the reference numeral 10. A typical vehicle comprises an internal combustion engine (not shown), a body (not shown), a suspension system (not shown) and exhaust system 10 which is attached to the internal combustion engine and which is supported typically beneath the vehicle. The internal combustion engine is designed to power one or more drive wheels of the vehicle and the exhaust system routes the products of combustion to a desired exhaust location around the outside of the vehicle.

Exhaust system 10 comprises an intermediate pipe 12, a muffler 14, a tailpipe 16 and a plurality of isolator assemblies of various designs. Intermediate pipe 12 is typically connected to the engine or to a catalytic converter (not shown) which is then attached to an exhaust pipe which extends between the engine and the catalytic converter. The catalytic converter may be attached to a single exhaust pipe which leads to a single exhaust manifold or the catalytic converter can be attached to a branched exhaust pipe which leads to a plurality of exhaust pipes which lead to a plurality of exhaust manifolds. Also, intermediate pipe 12 can be attached to a plurality of catalytic converters which connect together prior to reaching muffler 14 using intermediate pipe 12 or the vehicle can have a plurality of exhaust pipes, a plurality of catalytic converters, a plurality of intermediate pipes 12 and a plurality of mufflers 14 which connect together using a single or multiple tailpipes 16. In addition, the exhaust system isolator of the present invention is applicable to any type of exhaust system including but not limited to dual exhaust systems which have two separate parallel exhaust systems extending from the internal combustion system.

Exhaust system 10 is utilized to route the exhaust gases from the engine to a desired location around the outside of the vehicle. While traveling through the exhaust system, the catalytic converter cleans the exhaust gases and muffler 14 quiets the noise created during the combustion process in the engine. The present invention is directed toward the exhaust system isolators which mount exhaust system 10 to the vehicle while at the same time, isolate the movement of exhaust system 10 with respect to the vehicle.

Referring now to FIGS. 1-3, an exhaust system isolator assembly 30 comprises a bracket 32 and an exhaust system isolator 34. Bracket 32 is a metal or plastic component which defines a pair of mounting flanges 36 and an isolator interface 38. Each of the pair of mounting flanges 36 defines a mounting bore 40 which accepts a fastener for securing exhaust system isolator assembly 30 to a vehicle frame or another structural component of the vehicle. While FIG. 1 illustrates mounting flanges 36 being generally perpendicular to each other, it is within the scope of the present disclosure to arrange mounting flanges 36 in any orientation which is required to have bracket 32 properly interface with the mounting structure of the vehicle.

Exhaust system isolator 34 comprises an inner structural member 50, an outer structural member 52 and an elastomeric body 54 disposed between structural members 50 and 52.

Elastomeric body 54 defines a mounting bore 58 which is designed to accept an inner tube, a bolt, or a hanger pin 60. Hanger pin 60 is attached to a component of exhaust system 10. While bracket 32 is disclosed as being attached to a structural component of the vehicle and exhaust system isolator 34 is disclosed as being attached to a component of exhaust system 10, using hanger pin 60, it is within the scope of the present disclosure to have bracket 32 attached to exhaust system 10 and exhaust system isolator 34 attached to a structural component of the vehicle using hanger pin 60. Thus, exhaust system 10 is secured to the vehicle through one or more exhaust system isolator assemblies 30.

Elastomeric body 54 defines one or more press-fitting apertures 62 that extend through elastomeric body 54 and through inner structural member 50. Press-fitting apertures 62 allow for the press-fix of outer structural member 52 onto bracket 32. Another option would be to integrate outer structural member 52 and bracket 32 such that outer structural member 52 is attached to exhaust system 10 or the structural component of the vehicle. After press-fit, typically a crimping of bracket 32 over outer structural member 52 further secures the attachment. If tuning of exhaust system isolator 34 in different directions is needed, press-fit apertures 62 can be used to provide a non-continuous annular wall for elastomeric body 54. Elastomeric body 54 defines an outer circumferential void 64 and an inner circumferential void 66. While void 66 is illustrated as being asymmetrical with respect to mounting bore 58, it is within the scope of the present disclosure to have void 66 symmetrical with mounting bore 58. The asymmetrical design for void 66 permits mounting bore 58 to become disposed at or near the centerline of outer structural member 52 during the assembled or statically loaded condition of exhaust system isolator assembly 30.

The design of void 66, specifically its thickness, will determine the amount of travel of mounting bore 58 with respect to outer structural member 52 and bracket 32 until the load to radially deflect exhaust system isolator assembly 30 spikes up due to the closing of void 66. Until the closing of void 66, the radial movements of mounting bore 58 cause pure shear in elastomeric body 54 regardless of the loading direction. This shear loading occurs in the portion of elastomeric body 54 disposed between outer structural member 52 and inner structural member 50 as discussed below.

As can be seen in the figures, void 64 overlaps inner circumferential void 66 in the axial direction to define a shear hub 70 which undergoes the shear loading due to the deflection of elastomeric body 54. During larger loading of exhaust system isolator assembly 30, void 66 will close until inner structural member 50 makes contact with bracket 32 if bracket 32 is provided separate from outer structural member 52 or with outer structural member 52 if bracket 32 is integrated into outer structural member 52. This contact between inner structural member 50 and bracket 32 or outer structural member 52 eliminates the compression and thus the compression stresses on shear hub 70 when exhaust system isolator assembly 30 experiences high ground-out loads. This improves both the performance and the reliability of exhaust system isolator assembly 30.

An optional annular elastomeric heat shield 72 forms the outer portion of outer circumferential void 64. Elastomeric heat shield 72 is integral with elastomeric body 54. Elastomeric heat shield 72 provides protection against external sources of heat for shear hub 70.

Inner structural member 50 is a flanged cylindrical metal or plastic component which includes an axial cylinder 76 and a radial flange 78. Axial cylinder 76 extends over mounting bore 58 and radial flange 78 extends radially outward from axial cylinder 76 to provide a base for shear hub 70. Elastomeric body 54 is bonded to inner structural member 50 including shear hub 70 being bonded to radial flange 78.

Outer structural member 52 is a flanged cylindrical metal or plastic component which includes an axial cylinder 82 and a radial flange 84. Axial cylinder 82 extends along the outer circumferential surface of inner circumferential void 66 and is designed to be press-fit or otherwise accept bracket 32. While exhaust system isolator assembly 30 is illustrated using a separate bracket 32, it is within the scope of the present disclosure to integrate outer structural member 52 and bracket 32 and bond shear-hub 70 directly to bracket 32. Radial flange 84 extends radially outwardly from axial cylinder 76 to provide a base for shear hub 70 at the opposite end of shear hub 70. Elastomeric body 54 is bonded to outer structural member 52 including shear hub 70 being bonded to radial flange 84.

Bracket 32 is a metal or plastic bracket having an inner cylindrical wall 86, an outer wall 88 and a radial wall 90 extending between inner cylindrical wall 86 and outer wall 88. Inner cylindrical wall 86 is designed to be press-fit within an aperture defined by axial cylinder 82 of outer structural member 52 as illustrated in FIG. 2.

Referring now to FIG. 2, it can be seen that axial cylinder 76 of inner structural member 50 extends through the aperture defined by axial cylinder 82 of outer structural member 52 and through inner cylindrical wall 86 of bracket 32. This provides a travel stop for the radial movement of inner structural member 50 in relation to outer structural member 52 which eliminates compression and thus compression stresses on shear hub 70. Inner structural member 50 will move radially with respect to outer structural member 52 to close inner circumferential void 66 until inner structural member 50 contacts bracket 32. An annular portion of elastomeric body 54 located on the outside of inner structural member 50 provides a cushioning affect and avoids direct contact between inner structural member 52 and bracket 32. If bracket 32 is integrated with outer structural member 52 to attach exhaust system isolator assembly 30 to the structural component of the vehicle, either axial cylinder 82 of outer structural member 52, the structural component of the vehicle or a separate bracket can be used for the stop.

Exhaust system isolator 34 avoids tension stress loading in elastomeric body 54 during radial loading. The shear style loading in all directions enables exhaust system isolator 34 to achieve a lower and more stable rate of deflection. This is because the shear modulus (shear loading) is lower than the elasticity modulus (tensile loading). Also, the spring rate of elastomeric materials in shear is more consistent than in tensile. The rates and deflections are capable of being symmetrical about the center axis or they can be tuned using press-fit apertures 62 or by otherwise altering the size or shape of elastomeric body 54 or the rigid structures. An additional advantage is that the rate of deflection for shear hub 70 is linear throughout the deflection (until void 66 closes) which adds robustness to the design in regards to the position. This means that any pre-load from positional tolerances will not spike the rates of deflection and make the Noise, Vibration and Harshness (NVH) of the vehicle change with the exhaust geometry tolerances.

Referring now to FIG. 4, an exhaust system isolator assembly 130 in accordance with another embodiment of the present disclosure is disclosed. Exhaust system isolator assembly 130 comprises a bracket 132 and a pair of exhaust system isolators 34. The use of bracket 132 instead of bracket 32 permits exhaust system isolator assembly 130 to be attached to the vehicle and the exhaust system using a pair of hanger pins 60. The above discussion regarding bracket 32 applies also to bracket 132.

The mounting system for exhaust system isolator 34 is not limited to using bracket 32 or bracket 132. Any of the mounting systems disclosed in Applicant's co-pending application Ser. No. 11/233,283, the disclosure of which is incorporated herein by reference, could be utilized to mount exhaust system isolator 34 to the vehicle.

What is claimed is:

1. An isolator comprising:
    an elastomeric body;
    an outer structural member attached to said elastomeric body, said outer structural member having a radially extending flange defining a surface bonded to said elastomeric body; and
    an inner structural member attached to said elastomeric body, said inner structural member having a cylinder extending in an axial direction and a radially extending flange defining a surface bonded to said elastomeric body extending radially outwardly from a first terminal end of said cylinder of said inner structural member, said cylinder of said inner structural member defining a second terminal end opposite to said first terminal end in the axial direction; wherein
    said elastomeric body defines a shear hub extending between said radially extending flange of said outer structural member and said radially extending flange of said inner structural member;
    said surface of said radially extending flange of said outer structural member facing said surface of said radially extending flange of said inner structural member in said axial direction;
    said outer structural member includes an axially extending cylinder, said radially extending flange of said outer structural member extending radially outward from said axially extending cylinder of said outer structural member; and
    said entire axially extending cylinder of said outer structural member being disposed radially outward from said axially extending cylinder of said inner structural member between said first and second terminal ends.

2. The isolator according to claim 1, wherein said radially extending flange of said inner structural member is axially opposed to said radially extending flange of said outer structural member.

3. The isolator according to claim 2, further comprising a rigid mounting bracket attached to said outer structural member.

4. The isolator according to claim 3, wherein radial movement of said inner structural member with respect to said outer structural member causes said axial cylinder of said inner structural member to contact said outer structural member.

5. The isolator according to claim 1, wherein said elastomeric body defines a first circumferential void disposed around said inner structural member, said shear hub being defined by said first circumferential void.

6. The isolator according to claim 5, wherein said elastomeric body defines a second circumferential void, and said second circumferential void defines a heat shield surrounding said shear hub.

7. The isolator according to claim 6, wherein said heat shield is integral with said elastomeric body.

8. The isolator according to claim 1, wherein said elastomeric body defines a mounting bore extending through said elastomeric body, said axial cylinder of said inner structural member extending over said mounting bore.

9. The isolator according to claim 1, wherein said outer structural member defines a bracket.

10. An isolator comprising:
an elastomeric body;
an outer structural member attached to said elastomeric body, said outer structural member having a radially extending flange defining a surface bonded to said elastomeric body;
an inner structural member attached to said elastomeric body, said inner structural member having a cylinder extending in an axial direction and a radially extending flange defining a surface bonded to said elastomeric body extending radially outwardly from said cylinder of said inner structural member; and
a heat shield surrounding a shear hub; wherein
said elastomeric body defines said shear hub extending between said radially extending flange of said outer structural member and said radially extending flange of said inner structural member;
said surface of said radially extending flange of said outer structural member facing said surface of said radially extending flange of said inner structural member in said axial direction.

11. The isolator according to claim 10, wherein said heat shield is integral with said elastomeric body.

12. An isolator comprising:
an elastomeric body;
an outer structural member attached to said elastomeric body, said outer structural member having a radially extending flange defining a surface bonded to said elastomeric body; and
an inner structural member attached to said elastomeric body, said inner structural member having a cylinder extending in an axial direction and a radially extending flange defining a surface bonded to said elastomeric body extending radially outwardly from said cylinder of said inner structural member; wherein
said elastomeric body defines a shear hub extending between said radially extending flange of said outer structural member and said radially extending flange of said inner structural member;
said surface of said radially extending flange of said outer structural member facing said surface of said radially extending flange of said inner structural member in said axial direction; and
said elastomeric body defines a press-fit aperture extending into said elastomeric body.

13. An isolator comprising:
an elastomeric body;
an outer structural member attached to said elastomeric body, said outer structural member having a radially extending flange defining a surface bonded to said elastomeric body; and
an inner structural member attached to said elastomeric body, said inner structural member having a cylinder extending in an axial direction and a radially extending flange defining a surface bonded to said elastomeric body extending radially outwardly from said cylinder of said inner structural member; wherein
said elastomeric body defines a shear hub extending between said radially extending flange of said outer structural member and said radially extending flange of said inner structural member;
said surface of said radially extending flange of said outer structural member facing said surface of said radially extending flange of said inner structural member in said axial direction; and
said inner structural member defines a press-fit aperture extending through said inner structural member.

14. An isolator comprising:
an elastomeric body;
an outer structural member attached to said elastomeric body, said outer structural member having a radially extending flange defining a surface bonded to said elastomeric body; and
an inner structural member attached to said elastomeric body, said inner structural member having a cylinder extending in an axial direction and a radially extending flange defining a surface bonded to said elastomeric body extending radially outwardly from said cylinder of said inner structural member; wherein
said elastomeric body defines a shear hub extending between said radially extending flange of said outer structural member and said radially extending flange of said inner structural member;
said surface of said radially extending flange of said outer structural member facing said surface of said radially extending flange of said inner structural member in said axial direction; and
said axial cylinder of said inner structural member extends through an aperture defined by said outer member to define a travel stop.

15. The isolator according to claim 14, wherein said radially extending flange of said inner structural member is axially opposed to said radially extending flange of said outer structural member.

16. An isolator comprising:
an elastomeric body;
an outer structural member attached to said elastomeric body, said outer structural member defining a first radially extending flange;
an inner structural member having a cylinder extending in an axial direction attached to said elastomeric body, said inner structural member defining a second radially extending flange, said cylinder of said inner structural member defining a first terminal end and a second terminal end opposite to the first terminal end in the axial direction; and
a shear hub defined by said elastomeric body, said shear hub extending between and being bonded to both a surface of said first radially extending flange of said outer structural member and a surface of said second radially extending flange of said inner structural member; wherein
said surface of said first radially extending flange of said outer structural member facing said surface of said second radially extending flange of said inner structural member in said axial direction;
said outer structural member defines an axially extending cylinder and said first radially extending flange extends radially outward from said axially extending cylinder of said outer structural member; and
said entire axially extending cylinder of said outer structural member being disposed radially outward from said axially extending cylinder of said inner structural member between said first and second terminal ends.

17. The isolator according to claim 16, wherein said isolator further comprises a bracket defining a cylindrical wall, said axially extending cylinder of said outer structural member engaging an outer peripheral surface of said cylindrical wall of said bracket.

18. An isolator comprising:
an elastomeric body;

an outer structural member attached to said elastomeric body, said outer structural member having a radially extending flange defining a surface bonded to said elastomeric body; and an inner structural member attached to said elastomeric body, said inner structural member having a cylinder extending in an axial direction and a radially extending flange defining a surface bonded to said elastomeric body extending radially outwardly from said cylinder of said inner structural member; wherein said elastomeric body defines a shear hub extending between said radially extending flange of said outer structural member and said radially extending flange of said inner structural member;

said surface of said radially extending flange of said outer structural member facing said surface of said radially extending flange of said inner structural member in said axial direction;

said elastomeric body defines a first circumferential void disposed around said inner structural member, said shear hub being defined by said first circumferential void; and said elastomeric body defines a second circumferential void, and said second circumferential void defines a heat shield surrounding said shear hub.

19. The isolator according to claim 18, wherein said heat shield is integral with said elastomeric body.

* * * * *